June 21, 1960   S. O. JONES   2,942,096
APPARATUS FOR ELECTRIC ARC STUD WELDING
Filed Dec. 27, 1957   2 Sheets-Sheet 1
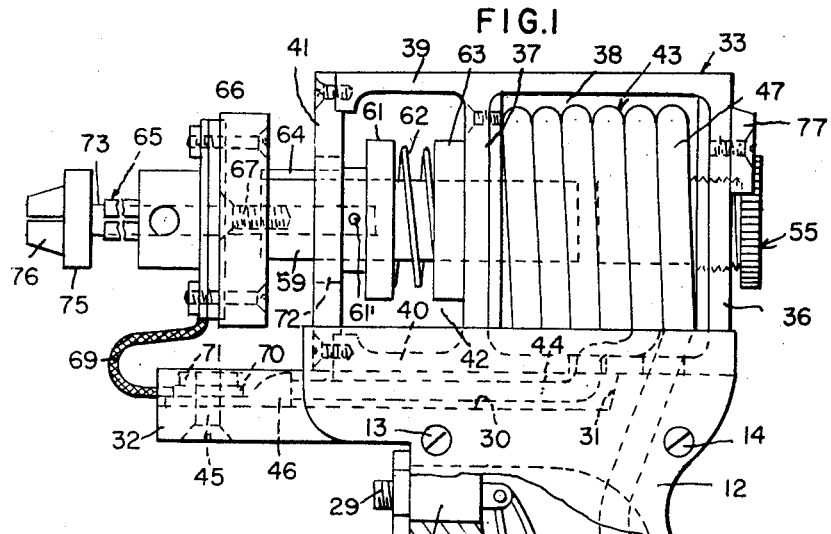
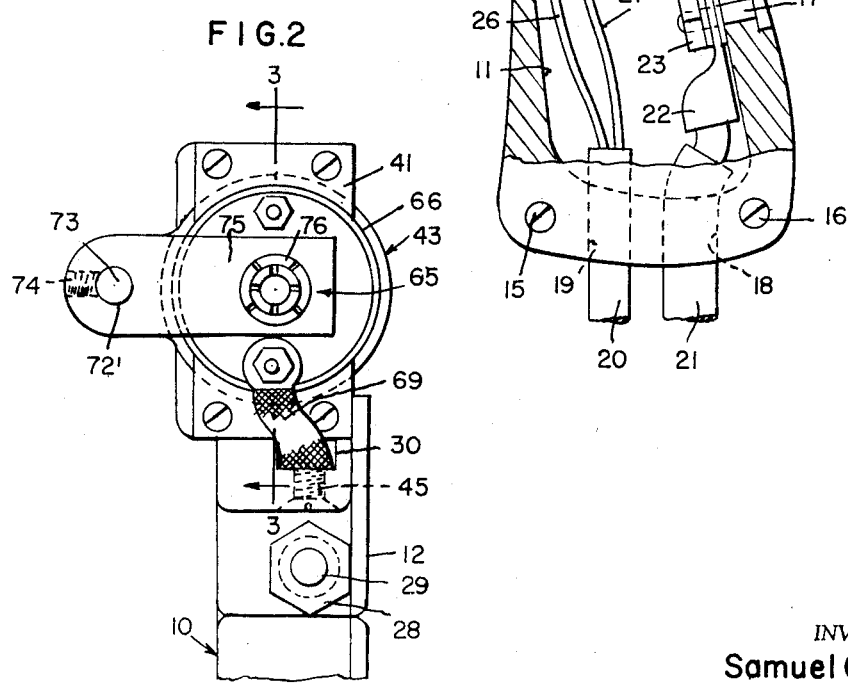
INVENTOR.
Samuel O. Jones
BY
Shoemaker & Mattare
ATTYS

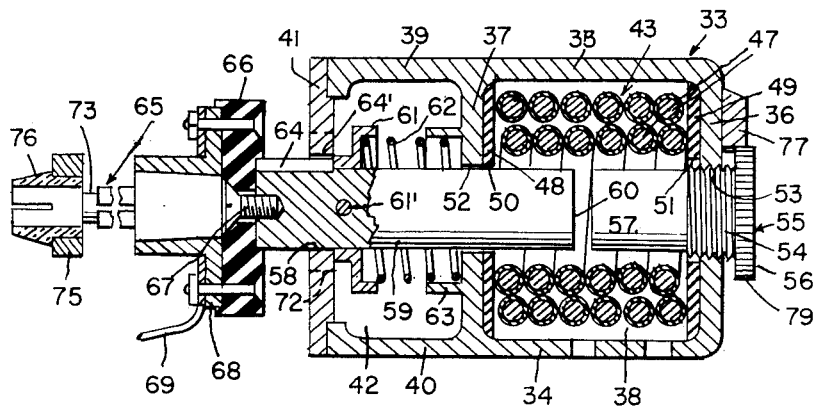
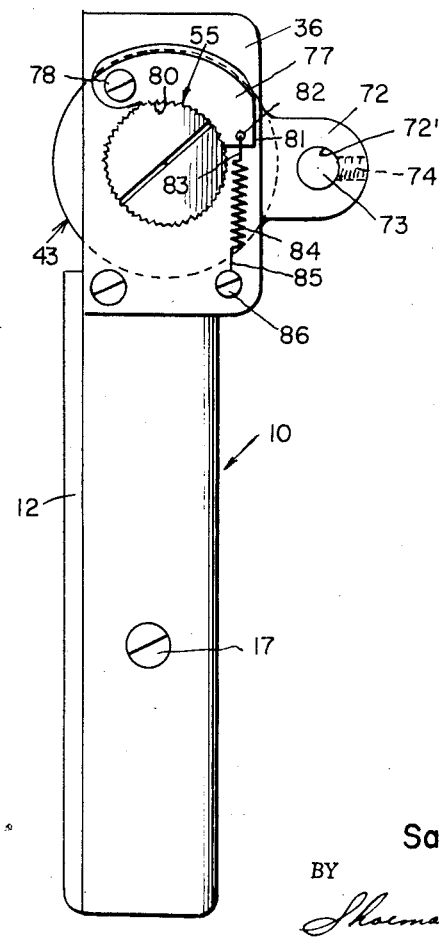

United States Patent Office 2,942,096
Patented June 21, 1960

2,942,096

APPARATUS FOR ELECTRIC ARC STUD WELDING

Samuel O. Jones, Newport News, Va., assignor to Newport News Shipbuilding and Dry Dock Company, Newport News, Va., a corporation of Virginia Filed Dec. 27, 1957, Ser. No. 705,638

2 Claims. (Cl. 219—98)

This invention relates to improvements in stud welding devices and pertains more particularly to improvements in electric arc stud welding guns.

A problem arises with regard to stud or pin welding aboard ships under circumstances in which more or less continuous welding operations are required. The problem stems from the fact that conventional stud welding guns are relatively heavy and an operator quickly becomes fatigued if a great number of studs are to be welded. It is, therefore, of primary concern in connection with this invention to provide improvements in electric arc stud welding guns wherein the same are so constructed and with their component parts so arranged as to minimize the weight thereof, maintaining the weight of the gun at a sufficiently low level as to enable an operator to utilize the gun over long periods of time without undue fatigue and at the same time without detracting from the efficiency of the gun or of the welds achieved thereby.

Another object of this invention is to provide an improved electric arc stud welding gun so constructed as to first achieve an extremely light weight and, secondly, so as to be easily cleaned and repaired and/or component parts thereof replaced.

A further object of this invention is to provide an improved electric arc stud welding gun including a light-weight handle assembly and having mounted on the upper end thereof a frame element of open construction and providing a platform or support for mounting component parts of the assemblage, the open frame construction not only presenting a light-weight construction but also permitting the operating coil of the gun to remain as cool as possible during continuous and prolonged operation.

Another object of this invention is to provide an improved electric arc stud welding gun in which the main frame is of open sided construction and is mounted on the upper end of the handle assembly, the frame having mounted therein an operating solenoid which also carries the welding current and with one lead of the solenoid extending below the main frame within a groove in the upper end of the handle for connection to a terminal at the forward end of the latter and with a flexible conductor extending from such terminal to a chuck reciprocably mounted in the frame.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a side elevational view of the improved electric arc stud welding gun with portions of the handle cover plate being broken away to show internal wiring connections;

Fig. 2 is a front elevational view of the upper portion of the gun as shown in Fig. 1;

Fig. 3 is a vertical section taken substantially along the plane of section line 3—3 in Fig. 2 and showing details of the construction of the gun; and Fig. 4 is a rear elevational view of the gun assembly.

Referring at this time more particularly to Fig. 1, the reference numeral 10 indicates generally the handle assembly which is formed of suitable insulating material and which is provided with a recess 11 extending inwardly from one side thereof and which is normally covered by a plate element 12 secured to the handle by means of suitable fasteners 13, 14, 15 and 16. Extending through the handle from the rear side thereof and projecting into the recess 11 is a bolt 17 which forms a terminal post and the lower end of the handle is provided with suitable apertures 18 and 19 through which the conductors 20 and 21 project so as to extend into the recess or chamber 11 as shown. The conductor 21 is the main welding current supply conductor and has a terminal end portion 22 connected to the post 17 and retaining an electrical contact therewith by means of the clamping nut 23. Also held on the post 17 is the terminal element 24 of conductor 25, the purpose of which will be presently apparent.

The other conductor 20 carries a pair of wires 26 and 27 which are connected to the terminal posts of a trigger switch 28, which switch is provided with an actuating plunger 29 positioned in trigger-like fashion with respect to the handle, as illustrated, and which, when depressed, electrically connects the two conductors 26 and 27 together to complete a circuit therethrough. When the circuit through conductors 26 and 27 is completed, the associated welding supply, not shown, and which may take any conventional form, is energized so as to supply welding current to the conductor 21.

The upper end surface of the handle assembly 10 is substantially flat with the exception of the groove 30 therein and which extends from the point 31 as shown in Fig. 1 and which extends to and through the forward end portion 32 of the handle. Mounted on the flat upper surface of the handle is a frame assembly indicated generally by the reference character 33 and which includes a lower plate element 34, see particularly Fig. 3, and an upper plate element 35, integrally connected by means of a rear web element 36 and an intermediate web 37, the two webs being disposed in spaced apart relationship and defining a solenoid chamber 38 therebetween. The upper and lower plates have portions 39 and 40 respectively extending beyond the intermediate web 37 and which are connected at their forward ends by means of a front plate element 41 so as to define a further chamber 42. Thus, the frame assembly defines a pair of open sided chambers 38 and 42.

The previously mentioned conductor 25 which is connected to the terminal post 17 within the handle assembly forms one end of a solenoid assembly indicated generally by the reference character 43 and which solenoid is disposed within the chamber 38, the opposite end 44 of the solenoid wire passing downwardly into the previously mentioned slot 30 and forwardly therein for connection to a terminal post 45. For connection to the terminal post 45, the solenoid conductor is provided with a terminal element 46, as is shown most clearly in Fig. 1. The intermediate portion of the solenoid is wrapped in a series of coils 47 which are sandwiched between the two web portions 36 and 37, insulating sheets 48 and 49 being interposed between the opposite ends of the solenoid coils and the associated inner faces of the webs 36 and 37. The insulating sheets 48 and 49 are provided with generally centrally disposed apertures 50 and 51 and the intermediate web 37 is provided with a central aperture 52 aligned with the aperture 50 in the sheet 48 and a smaller internally threaded aperture 53 is provided in the end web 36 concentrically of the sheet aperture 51. Threadedly engaged with the aperture 53 is the threaded shank portion 54 of adjusting screw 55 having an outer head portion 56 and an inner shank 57, the latter of which projects into the interior of the chamber 38 and within the confines of the coils 47 of the solenoid.

The cover plate 41 is provided with an aperture 58 which is aligned with the aperture 52 in the intermediate web 37 and the two of these apertures receive therethrough a plunger 59 having its inner end 60 disposed in opposed relationship to the inner end of the adjusting screw 55 in the manner shown most clearly in Fig. 3. The plunger 59 is provided with an annular cupped stop collar 61 secured to the plunger by a pin 61' adjacent the outer free end of the plunger, and seated within this collar is one end of a coil spring 62, the opposite end being seated within the recess defined by the annular wall 63 on the opposed face of the intermediate web 37. The spring 62 is slightly compressed even in the position shown in Fig. 3 so as to urge the stop collar 61 on the plunger 59 against the inner face of the cover plate 41 and normally retain the plate and plunger in this position to prevent relative rotation between the plunger 59 and the body of the gun, the plunger being provided with a key 64 which is fitted within a keyway 64' in the cover plate 41 while yet permitting reciprocable motion of the plunger 59.

Attached to the outer end of the plunger 59 is a chuck assembly indicated generally by the reference character 65, the same being of conventional construction. The manner of attachment of the chuck to the plunger is preferably such that the chuck is insulated from the plunger and for this purpose, an insulating bushing 66 is interposed between the two and with the attaching bolt 67 engaging only the bushing and the plunger to the exclusion of the chuck proper, as is shown most clearly in Fig. 3.

Extending from the previously mentioned terminal post 45 to the collar portion 68 of the chuck 65 is a flexible conductor 69, the opposite end thereof being provided with a suitable terminal portion 70 retained on the post 45 along with the terminal 46 by means of a nut 71.

The cover plate 41 is provided at one side thereof with an outwardly projecting ear 72 having an aperture 72' therein through which a leg member 73 is slidably projected and normally held in rigid position by means of a set screw 74 as seen most clearly in Figs. 2 and 4. A foot member 75 is secured to the outer end of the leg member and projects laterally therefrom. A sleeve 76 is supported by the foot member adjacent an opening formed therethrough and is adapted to hold a porcelain collar or ferrule, whereby a stud which is mounted within the chuck during operation is adapted to extend through the sleeve and ferrule supported thereby. The use of resilient sleeves for supporting a porcelain collar or ferrule in operative position relative to the chuck of a stud welding gun is well known in the art, and is shown, for example, in U.S. Re. Patent 24,367.

The operation of the device is such that when a stud or pin is inserted within the chuck 65, the same will project slightly beyond the outer end of the porcelain collar or ferrule supported by the sleeve member, and when the gun is placed against the bulkhead or the like, the spring 61 will consequently be slightly more compressed by virtue of the plunger 59 being retracted slightly from its position shown in Fig. 3. When the trigger switch 28 is actuated, welding current is supplied to the conductor 21 and through the solenoid conductor portion 25, through the solenoid 43 and from thence through the solenoid conductor portion 44, the flexible conductor 69 to the chuck and hence the stud, or pin held thereby. As the welding current flows, the solenoid 43 is energized to retract the plunger 59 to such a position as it engages the inner end portion of the adjusting screw 55, which screw is adjusted to a position such as to establish the proper grip between the end of the stud or pin and the work to strike the arc and cause the weld to take place. As soon as the trigger 29 is released, the spring 62 will plunge the plunger and chuck forward to force the pin into the molten pool of metal to complete the weld.

In order to adjust the screw 55, the same is rotated in one direction or the other, as required, and in order to hold the desired adjustment, the same is provided with a locking pawl element 77 which is pivotally mounted as by pivot bolt 78 on the outer face of the web 36. The peripheral portion 79 of the adjusting screw is serrated or notched and the inner concave surface 80 of the pawl 77 is likewise toothed or notched so as to effect a locking interengagement therebetween when the pawl is engaged against the head 56 of the adjusting screw. For this purpose, the free end 81 of the pawl is provided with an aperture 82 through which one end 83 of a tension spring 84 is hooked, the opposite end 85 of the spring being anchored to the fastening element 86. Since the spring 84 is normally under tension, it will retain the pawl in engagement with the head of the adjusting screw and prevent rotation of the same until such time as it is released by the operator.

The new and novel pin welding gun as disclosed herein weighs approximately 3 pounds in contrast to known guns of this type which weigh approximately 8 pounds. It is, accordingly, evident that a substantial saving has been made in weight, thereby enabling an operator to utilize the gun over long periods of time without undue fatigue, and yet the simplified structure provides welds of the same quality as those obtainable with much heavier guns.

I claim:

1. A stud welding gun comprising a hollow handle member having a mounting frame fixed to the upper end thereof, said mounting frame including upper and lower plate portions interconnected by an end web at one end thereof and an intermediate web so as to present an open-sided framework, a solenoid coil disposed between said end and intermediate webs and having an open central portion extending therebetween, a plunger having its inner end slidably projecting through said intermediate web and into said coil, a cover plate fixed to and bridging the forward ends of said upper and lower plates, a collar on said plunger between said cover plate and said intermediate web, a compression spring bearing against said collar and the opposed face of said intermediate web and normally engaging the collar against the inner surface of the cover plate, a chuck fixed to the outer end of said plunger and trigger means on said handle for selectively connecting said coil and chuck to a source of welding current, an electrical conductor providing the sole source of welding current extending within said hollow handle and being electrically connected to said solenoid coil, said solenoid coil being electrically connected with said chuck such that the solenoid coil and the chuck are connected in series with said conductor, said end web having a threaded opening formed therein, a threaded stop element received within said threaded opening and adapted to project within said coil, said stop element being selectively adjustable longitudinally of said frame and having an inner end adapted to engage said plunger for limiting axial movement of said plunger, said stop element including a portion extending outwardly of said end web and adapted to be manually engaged for adjusting the position of the stop element.

2. Apparatus as defined in claim 1, wherein said outwardly extending portion of the stop element includes a plurality of notches formed thereon, a locking pawl element pivotally mounted on the outer surface of said end web, said pawl element including an inner concave surface having notches formed therein complementary to the notches formed on the outer portion of said stop element, and a spring connected to said pawl element normally urging the inner surface of said pawl element into engagement with the outer portion of said stop element for locking the stop element in a predetermined operative position.

References Cited in the file of this patent

UNITED STATES PATENTS

| | | |
|---|---|---|
| 1,523,667 | Steele et al. | Jan. 20, 1925 |
| 1,995,001 | Ito | Mar. 19, 1935 |
| 2,191,494 | Nelson | Feb. 27, 1940 |
| 2,342,144 | Hughes | Feb. 22, 1944 |
| 2,413,189 | Nelson | Dec. 24, 1946 |
| 2,462,882 | Martin | Mar. 1, 1949 |
| 2,510,620 | Craven | June 6, 1950 |